United States Patent
Koide et al.

(10) Patent No.: US 6,472,125 B1
(45) Date of Patent: Oct. 29, 2002

(54) METHOD FOR MANUFACTURING INK JET RECORDING HEAD AND INK JET RECORDING HEAD MANUFACTURED BY SUCH METHOD OF MANUFACTURE

(75) Inventors: Jun Koide; Masahiko Kubota, both of Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 09/722,641

(22) Filed: Nov. 28, 2000

(30) Foreign Application Priority Data

Nov. 30, 1999 (JP) .......................... 11-339337
Feb. 3, 2000 (JP) ....................... 2000-025890

(51) Int. Cl.[7] .............................. B41J 3/04
(52) U.S. Cl. .................. 430/320; 430/945; 347/47; 347/65; 219/121.68; 219/121.61; 219/121.71
(58) Field of Search ................. 430/320, 945; 219/121.61, 121.68, 121.71; 347/65, 47

(56) References Cited

U.S. PATENT DOCUMENTS

| | | | |
|---|---|---|---|
| 5,211,806 A | 5/1993 | Wong et al. ................. 156/644 |
| 5,478,606 A | 12/1995 | Ohkuma et al. ............. 427/555 |
| 5,948,290 A | 9/1999 | Yamamoto et al. ..... 219/121.71 |
| 6,062,678 A | 5/2000 | Ishinaga et al. .............. 347/62 |
| 6,095,640 A | 8/2000 | Ishinaga et al. .............. 347/65 |
| 6,142,606 A | 11/2000 | Kubota et al. ................ 347/45 |

FOREIGN PATENT DOCUMENTS

| | | | |
|---|---|---|---|
| EP | 0 867 294 | * | 3/1998 |
| EP | 0 904 939 | | 3/1999 |

OTHER PUBLICATIONS

Halbout, J.–M. et al., 12–fs Ultrashort Optical Pulse Compression at a High Repetition Rate, Applied Physics Letters, American Institute of Physics, vol. 45, No. 12, Dec. 15, 1984, pp. 1281–1283.

* cited by examiner

*Primary Examiner*—John A. McPherson
(74) *Attorney, Agent, or Firm*—Fitzpatrick, Cella, Harper & Scinto

(57) ABSTRACT

A method for manufacturing an ink jet head. In a thick film laminating step, a patterning layer corresponding to the configuration of ink flow paths on a member provided with a pressure generating source is formed, and an inorganic material layer is overcoated on the patterning layer to form an ink discharge surface. A patterned image of a predetermined ink discharge port configuration is irradiated by a laser capable of completing a sublimate ablation process before the laser beams are dispersed in a work piece as thermal energy. Subsequently, the sublimate ablation process is executed on ink discharge ports almost simultaneously from the inorganic material layer on the ink discharge side up to the interior of the thickness of the patterning layer. The patterning layer is removed after processing the ink discharge ports.

18 Claims, 8 Drawing Sheets

METHOD FOR MANUFACTURING INK JET RECORDING HEAD AND INK JET RECORDING HEAD MANUFACTURED BY SUCH METHOD OF MANUFACTURE

BACKGROUND OF THE INVENTION

1. Field of the Invention

The present invention relates to a method for manufacturing an ink jet recording head, and an ink jet recording head manufactured by such method of manufacture. More particularly, the invention relates to a method for manufacturing an ink jet recording head capable of forming the head with inorganic material without depending on the use of organic resin material. The invention is also intended to materialize the provision of an ink jet recording head manufactured by such method of manufacture.

2. Related Background Art

Conventionally, the ink discharge mechanism of an ink jet recording head to which the ink jet recording method is applicable has in general comprised discharge ports for discharging ink; the liquid chamber which retains ink to be supplied to the discharge ports; the ink flow paths which are communicated with the discharge ports and the liquid chamber; each of energy generating elements arranged a part of each of the ink flow paths for generating energy to discharge ink; and an ink supply port through which ink is supplied from outside to the liquid chamber.

For the processing of the ink flow paths and ink discharge ports, among those described above, which require minute structures and high precision, it has been generally practiced in recent years to perform the patterning irradiation of high energy ultraviolet laser, such as excimer laser, onto the resin material for the formation of an intended structure, and then, to execute sublimate etching therefor by the application of the photo-chemical reaction for cutting covalent bond of carbon atom. Here, this method is called collectively an ablation processing method in a sense of being executable without the intervention of providing liquid phase.

Also, as another method, it has been proposed to form ink flow paths by use of the wet etching which acts upon a material of ultraviolet decay type. In this method, the photolithographic process is used for processing an IC chip having a pressure generating source thereon with two kinds of resin materials, that is, the one that decays by the irradiation of ultraviolet rays, and the other that does not absorb ultraviolet rays, and then, a pattern that corresponds to the configuration of ink flow paths is made by use of the material of ultraviolet decay type, while the other side thereof is provided with an overcoated layer for the formation of ink discharge ports. Then, after the ink discharge ports have been etched, the material of ultraviolet decay type, which is processed in the form of the ink flow paths by the irradiation of ultraviolet rays, is low molecularly quantified to be conditioned so that solvent can be eluted.

However, although it is possible to process resin material by use of these conventional methods, it is difficult to process materials other than resin, thus necessitating use of a processible resin material for the formation of an intended structure. As a result, processing should be made dependent on the resin material despite such properties thereof as lower mechanical strength, easier surface spoilage, heating limit due to lower glass transition point, and the higher thermal expansion and moisture absorption coefficients which may result in easier generation of inner stress due to environmental temperatures or humidities, among some others. These may ensue in easier deformation or some other characteristic problems of resin material.

Particularly in case of an ink jet recording head, it is extremely difficult for the resin material to meet such requirements as higher durability and higher reliability so as to prevent the ink discharge surface from being spoiled due to chipping thereof and peeling off of water-repellent agent or inferior capability to maintain water-repellency, or so as to prevent it from the breakage of the bonded faces due to the generation of inner stress.

SUMMARY OF THE INVENTION

Now, therefore, the present invention is designed with a view to solving these problems encountered in the conventional art. It is an object of the invention to provide a method for manufacturing a highly durable and reliable ink jet recording head formed with inorganic material without depending on use of organic material so as to make it hard, and not easily damaged, and also, to enable the ink discharge surface thereof not to be easily spoiled, and the bonded faces not easily broken due to the inner stress, either. It is also an object of the invention to provide an ink jet recording head manufactured by such method of manufacture.

In order to achieve these objects, the invention provides a method for manufacturing an ink jet recording head, as well as an ink jet recording head manufacture by such method of manufacture, which are structured as described in the following paragraphs (1) to (18).

(1) A method for manufacturing an ink jet head, which is provided with an ink discharge mechanism structured to include at least an ink discharge port and an ink flow path on a member having a pressure generating source thereon, the pressure generating source giving pressure to ink being in contact therewith so as to propagate the pressure to the ink discharge port for discharging an ink droplet, and enabling the ink droplets to adhere to a recording medium, comprises the steps of forming in a thick film laminating step a patterning layer corresponding to the configuration of ink flow path on a member provided with the pressure generating source, and overcoating inorganic material layer on the pattering layer to form ink discharge surface; irradiating the patterned image of predetermined ink discharge port configuration by laser capable of completing sublimate ablation process before the laser beam is dispersed in a work piece as thermal energy;

subsequently, executing the sublimate ablation process on ink discharge ports almost simultaneously from the inorganic material layer on the ink discharge side up to the interior of the thickness of the patterning layer corresponding to the configuration of ink flow path; and removing the patterning layer corresponding to the configuration of the ink flow path after processing the ink discharge port to manufacture an ink jet recording head.

(2) A method for manufacturing an ink jet recording head referred to in the paragraph (1), wherein the laser is the laser continuously emitting from a laser oscillator photopulse (optical pulse) having large spatial and temporal energy concentration in pulse emission period of one picosecond or less, and the laser beam emitted from the laser oscillator is irradiated on a specifically patterned image with a predetermined energy concentration and a predetermined number of aperture (NA) for the execution of sublimate ablation almost simultaneously from the inorganic material layer on the ink discharge side up to the interior of the thickness of the patterning layer corresponding to the configuration of the ink flow paths.

(3) A method for manufacturing an ink jet recording head referred to in the paragraph (1) or (2), wherein the energy concentration of laser beams satisfies the conditional expression of $$(a \times n \times E)/t > 13 \times 10^9 [W/cm^2]$$

where a is the absorptivity of the laser wave length irradiated to a work piece material; n is the number of aperture of the optical system on the work piece side to project the processing pattern to the work piece; E (unit [J/cm²/pulse]) is energy per unit area of the laser beam irradiated onto the work piece material per unit oscillating pulse period; and t (unit [sec]) is the width of laser oscillation pulse period.

(4) A method for manufacturing an ink jet recording head referred to in the paragraph (1), wherein the laser oscillator is a laser oscillator provided with a spatial compression device for light propagation.

(5) A method for manufacturing an ink jet recording head referred to in the paragraph (4), wherein the spatial compression device for light propagation comprises chirping pulse generating means; and vertical mode synchronizing means utilizing light wavelength dispersion characteristics.

(6) A method for manufacturing an ink jet recording head referred to in the paragraph (1), wherein the formation of the patterning layer corresponding to the configuration of the ink flow path is made by means of photolithographic process.

(7) A method for manufacturing an ink jet recording head referred to in the paragraph (1), wherein the patterning layer corresponding to the configuration of the ink flow paths is formed by metallic material.

(8) A method for manufacturing an ink jet recording head referred to in the paragraph (1), wherein the overcoating of the inorganic material layer for the formation of the ink discharge surface is formed by means of CVD or other chemical deposition development method.

(9) A method for manufacturing an ink jet recording head referred to in the paragraph (1), wherein the overcoating of the inorganic material layer for the formation of the ink discharge surface is formed by means of PVD or plasma flame or other physical deposition development method.

(10) A method for manufacturing an ink jet recording head referred to in the paragraph (1), wherein subsequent to overcoating the inorganic material layer for the formation of the ink discharge surface, the ink discharge surface is polished or grounded for processing for smoothing the ink discharge surface.

(11) A method for manufacturing an ink jet recording head referred to in the paragraph (1), wherein subsequent to overcoating the inorganic material layer for the formation of the ink discharge surface, the ink discharge surface is coated with water-repellent agent and thermally cured.

(12) A method for manufacturing an ink jet recording head referred to in the paragraph (1), wherein the inorganic material layer for the formation of the ink discharge surface is formed by dielectric or ceramic material.

(13) A method for manufacturing an ink jet recording head referred to in the paragraph (1), wherein the removal of the patterning layer corresponding to the configuration of the ink flow paths is performed by means of wet etching or other chemical etching.

(14) A method for manufacturing an ink jet recording head referred to in the paragraph (1), wherein the method for manufacturing an ink jet recording head is the method of manufacture of an ink jet recording head of plane discharge type having the pressure generating source arranged above the ink discharge port, and the ink discharge port is processed by sublimate ablation almost simultaneously from the inorganic material layer on the ink discharge side up to the interior of the thickness of the patterning layer corresponding to the configuration of the ink flow path.

(15) A method for manufacturing an ink jet recording head referred to in the paragraph (1), wherein the method for manufacturing an ink jet recording head is the method of manufacture of an ink jet recording head of edge shooter type comprising an ink liquid chamber for supplying ink to the ink discharge port, an ink flow path communicated with the ink liquid chamber, an ink supply port for supplying ink from the outside to the ink liquid chamber, and an energy generating element provided for part of the ink flow path forming the pressure generating source, and the ink discharge formation surface is formed by removing the edge face of the inorganic material layer by cutting or grinding or polishing from the edge face side of the patterning layer overcoated on the edge face and upper face of the inorganic material layer so as to provide a specific thickness thereof, and then, the ink discharge port is processed on the ink discharge port formation surface by sublimate ablation almost simultaneously from the ink discharge side to the edge face of the patterning layer up to the interior thereof.

(16) An ink jet recording head provided with an ink discharge mechanism structured to include at least an ink discharge port and an ink flow path on a member having a pressure generating source thereon, the pressure generating source giving pressure to ink being in contact therewith so as to propagate the pressure to the ink discharge port for discharging an ink droplet, and enabling the ink droplets to adhere to a recording medium, wherein the ink jet recording head is manufactured by a method for manufacturing an ink jet recording head referred to in either one of the paragraphs (1) to (15).

(17) An ink jet recording head referred to in the paragraph (16), wherein the ink jet recording head is plane discharge type having the ink discharge port arranged above the pressure generating source.

(18) An ink jet recording head referred to in the paragraph (16), wherein the ink jet recording head is edge shooter type having said ink discharge port on the edge side of said inorganic material layer.

As described above, in accordance with the present invention, it is possible to form the structural members, such as the ink discharge surface of an ink jet recording head, with dielectric or ceramic or other inorganic. material without depending on organic resin material. Therefore, not only it becomes possible to form an ink jet surface or the like which is hard and not easily damaged, but also, to burn and coat water-repellent agent, because heat treatment can be given at a temperature of as high as approximately 500° C. The durability of the water-repellent film, and the durability of the ink discharge surface or the like can be enhanced significantly. As a result, materials can be selected more freely in consideration of thermal expansion, moisture expansion, and other problems. Then, with an optimal designing, it becomes possible to manufacture a highly durably and reliable ink jet recording head.

DETAILED DESCRIPTION OF THE PREFERRED EMBODIMENTS

With the structure arranged as described above, it becomes possible to materialize a method for manufacturing an ink jet recording head which does not deteriorate the ink discharge surface, and does not cause any breakage of the bonded faces due to the inner stress, either, and also, materialize the provision of an ink jet recording head manufactured by such method of manufacture.

To describe them more specifically, inorganic material or metallic material can be processed by the application of the laser beams which are emitted from a laser oscillator capable of outputting laser beams at a pulse emission period of one picosecond or less. This laser process is utilized in the thick-film lamination process in order to form the patterning layer that inorganic material that contains the binding of Si, $SiO_2$, SiN, and the like has a fusion point of as high as 1500° C. or more, which requires an instantaneous irradiation of higher thermal energy in order to perform sublimate ablation process for such material. There is a limit in processing it by use of the conventional excimer laser, but with the femtosecond laser, it becomes possible to process a material of the kind easily.

Now, hereunder, the description will be made of the embodiments in accordance with the present invention.

First Embodiment

FIGS. 1A to 2E are views which illustrate a method for manufacturing the ink discharge mechanism portion of an ink jet recording head in accordance with a first embodiment of the present invention.

Now, in conjunction with FIGS. 1A to 2E, the outline of the method for manufacturing the ink discharge mechanism portion of the ink jet recording head will be described in accordance with the present embodiment.

Figure 1A:
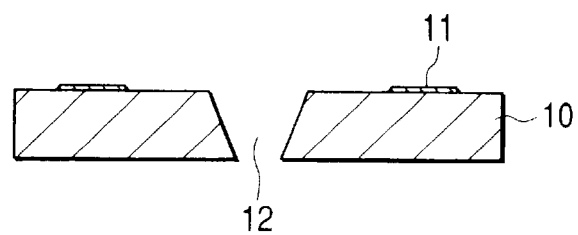
FIGS. 1A, 1B, 1C, 1D and 1E are views which illustrate the steps in which is manufactured the ink discharge mechanism portion of an ink jet recording head in accordance with a first embodiment of the present invention.

At first, as shown in FIG. 1A, a base plate is prepared with an ink supply port 12 formed by etching a silicon circuit base plate 10 which is formed by patterning the ink discharge pressure generating element 11 on silicon.

Figure 1B:
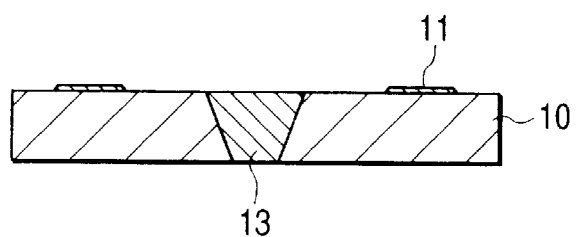

Then, as shown in FIG. 1B, resin 13 is clogged into the ink supply port 12.

Figure 1C:
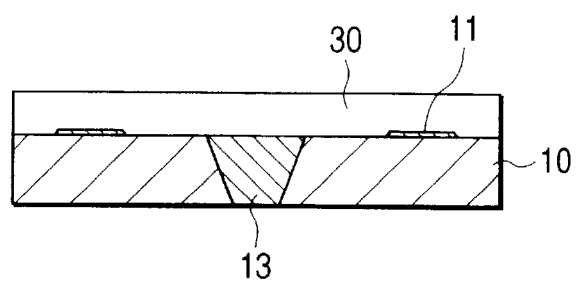

Subsequently, as shown in FIG. 1C, an aluminum layer 30 is laminated by means of vapor deposition to be coated in a predetermined thickness on the ink discharge pressure generating element 11 side.

Figure 1D:
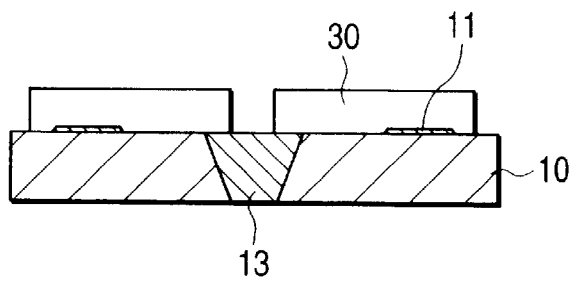

Now, as shown in FIG. 1D, with the patterning lithographic process, the coated aluminum layer 30 is patterned to provide specific ink flow paths, ink buffer chamber, and ink chamber.

Figure 1E:
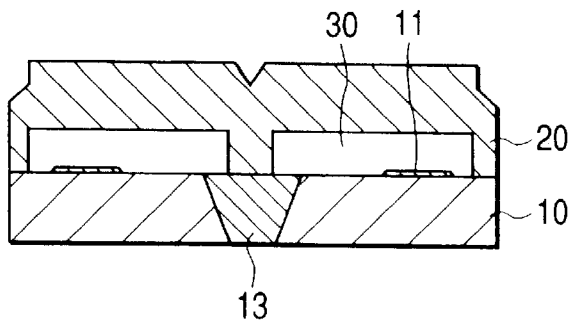

Then, as shown in FIG. 1E, a silicon nitride layer 20 is formed by means of CVD in a form to cover the patterned aluminum layer 30.

Figure 2A:
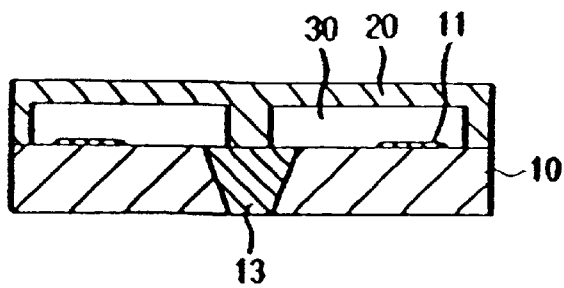
FIGS. 2A, 2B, 2C, 2D and 2E are views which illustrate, in continuation of the steps shown in FIGS. 1A to 1E, the steps in which is manufactured the ink discharge mechanism portion of the ink jet recording head in accordance with the first embodiment of the present invention.

Then, as shown in FIG. 2A, the surface of the silicon nitride layer 20, which is irregular due to the material which has been deposited and developed, is made flat and smooth by polishing.

Figure 2B:
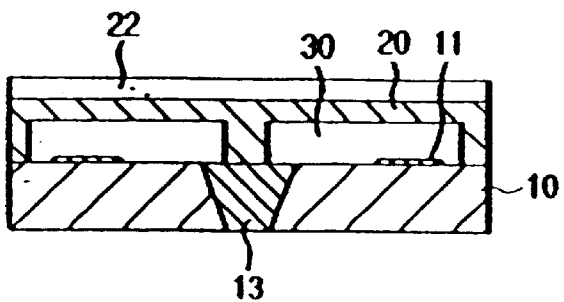
Figure 2C:
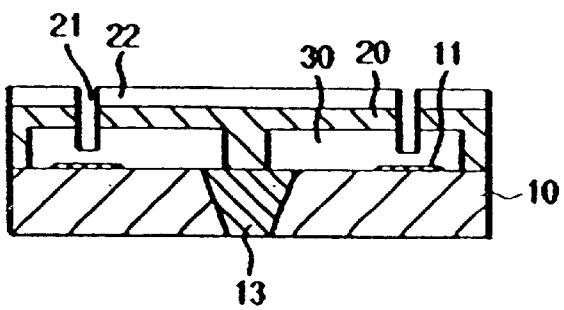

Now, as shown in FIG. 2B, a water-repellent film 22 is coated on the surface of the silicon nitride layer 20, and as shown in FIG. 2C, the aluminum layer 30 is processed up to the middle of its thickness by irradiating laser beams through the pattern of the specific ink discharge port configuration with the specific energy concentration and specific NA thereof, which is emitted from the laser oscillator that outputs laser beams in a pulse emission period of one picosecond or less from the surface side of the silicon nitride layer 20. Thus, with the completion of laser processing up to the inner portion of the aluminum layer 30 which is a patterned layer, the discharge port is formed in high precision without damaging the ink discharge pressure generating element which is provided underneath the discharge port. In this respect, the processing depth is not necessarily up to the middle of the thickness of the pattering layer as described if only the depth should be within the thickness range thereof.

Figure 2D:
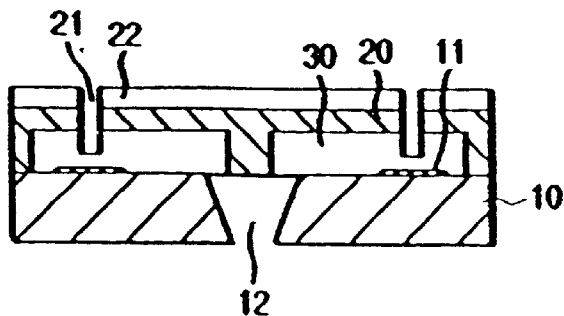

Now, as shown in FIG. 2D, the resin 13 clogged into the ink supply port 12 is removed by means of wet chemical etching.

Figure 2E:
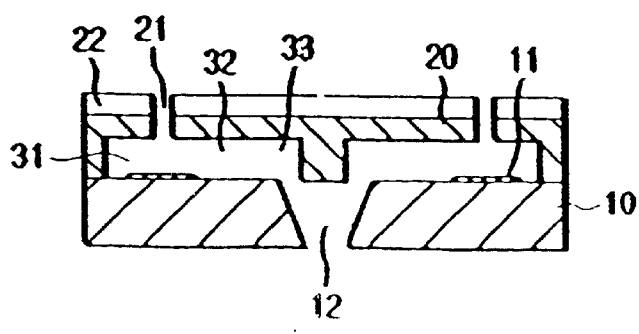

Thus, as shown in FIG. 2E, the aluminum layer 30 having been patterned in the specific form of ink flow paths 32, ink buffer chamber 31, and ink chamber 33 is removed by means of wet etching to complete the ink discharge mechanism portion of the ink jet recording head subsequent to having thermally cured the entire portion thereof at a temperature of 300° C. for the enhancement of the adhesiveness of water-repellent film.

Now, in conjunction with FIGS. 3A and 3B, the description will be made of the structure of the ink discharge mechanism portion of an ink jet recording head of plane discharge type.

Figure 3A:
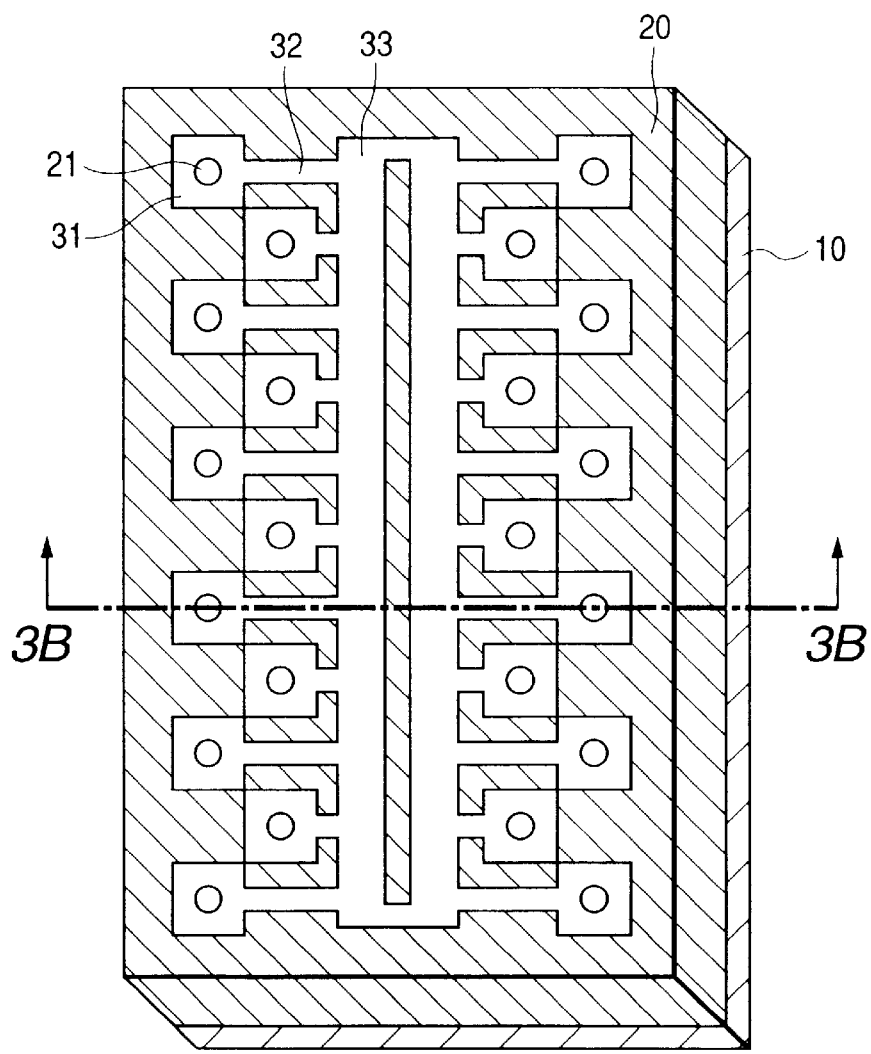
FIGS. 3A and 3B are views which illustrate the principal part of the ink discharge portion of an ink jet recording head of plane discharge type formed by a method of manufacture in accordance with the first embodiment of the present invention.
Figure 3B:
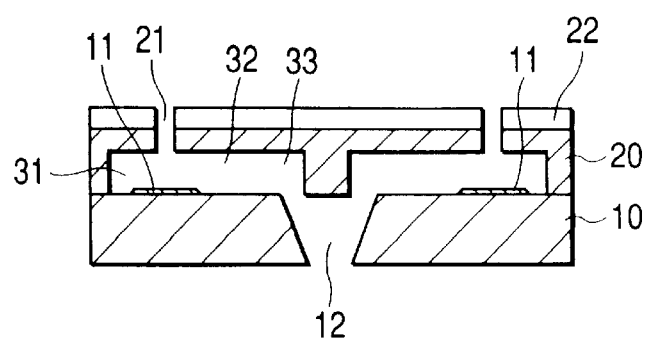

FIG. 3A is a view which shows the principal ink discharge portion of the plane type ink jet recording head, observed from the ink discharge surface side. FIG. 3B is a cross-sectional view taken at the 3B—3B position shown in FIG. 3A. This discharge port portion is processed by the method described in conjunction with FIGS. 1A to 2E to form the ink discharge ports on the silicon IC circuit base plate 10 having ink discharge pressure generating elements 11 formed thereon.

As shown in FIG. 3A, the ink discharge port through which ink is discharged is patterned two-dimensionally for the formation of a highly densified nozzle arrangement.

The ink discharge principal portion of the ink jet recording head described above can be manufactured through the following steps to be an ink jet recording head.

The electrical base plate having the terminals for use of driving ink discharge pressure generating elements patterned thereon is bonded, and at the same time, the aluminum or alumina-ceramic base plate is bonded to the silicon IC base plate for use of heat radiation. Then, the holder that holds each member, and the ink tank that supplies ink are bonded to assemble an ink jet head, hence providing a unit that functions as the ink jet recording head.

Second Embodiment

FIGS. 4A to 5C are views which illustrate a method for manufacturing the ink discharge mechanism portion of an ink jet recording head in accordance with a second embodiment of the present invention.

Now, in conjunction with FIGS. 4A to 5C, the outline of a method for manufacturing the ink discharge mechanism portion of an ink jet recording head will be described in accordance with the present embodiment.

Figure 4A:
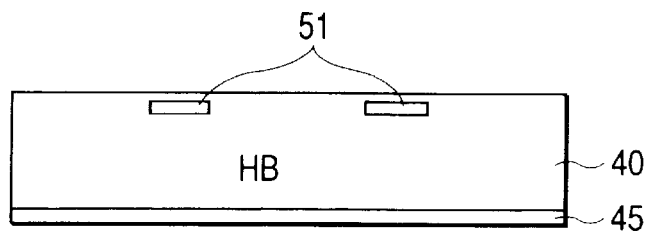
FIGS. 4A, 4B, 4C, 4D and 4E are views which illustrate the steps in which is manufactured the ink discharge mechanism portion of an ink jet recording head in accordance with a second embodiment of the present invention.

At first, as shown in FIG. 4A, a base plate 40 is prepared with the $SiO_2$ layer 45 formed on the lower face on one hand, and ink discharge pressure generating elements 41 arranged on the upper face on the other hand.

Figure 4B:
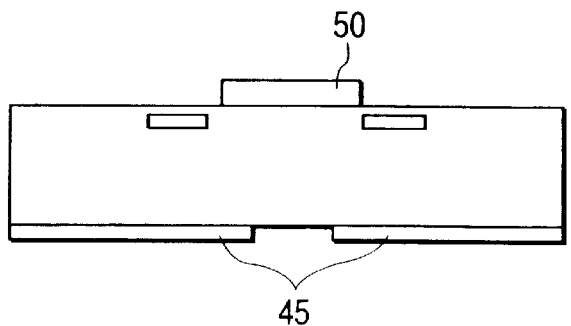

Then, as shown in FIG. 4B, the $SiO_2$ layer 45 on the lower face of the base plate 40, which corresponds to the portion of the base plate 40 where an ink supply port 52 is formed, is removed, and an aluminum layer 50 is deposited by means of vapor deposition to be coated in a predetermined thickness on the upper face of the base plate 40 which corresponds to the portion where the ink supply port 53 is formed on the base plate 40, and then, patterned.

Figure 4C:
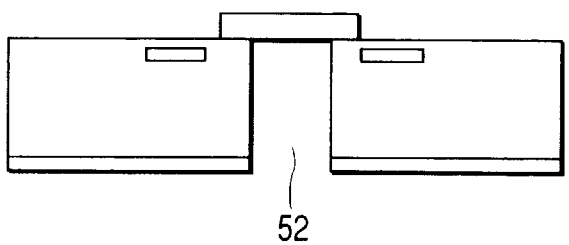

Then, as shown in FIG. 4C, the ink supply port 52 is etched to be formed on the base plate 40.

Figure 4D:
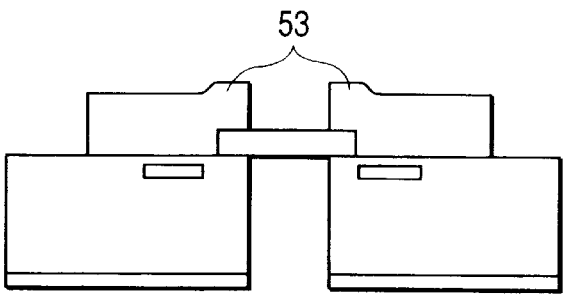

Subsequently, as shown in FIG. 4D, the aluminum layer 53, which is patterned in the configuration of specific ink flow paths 42, ink buffer chamber 41, and ink chamber 43, is deposited by means of vapor deposition to be coated in a predetermined thickness from the aluminum layer 50 on the upper face of the base plate 40 to the ink discharge pressure generating element 11 side, and then, patterned.

Figure 4E:
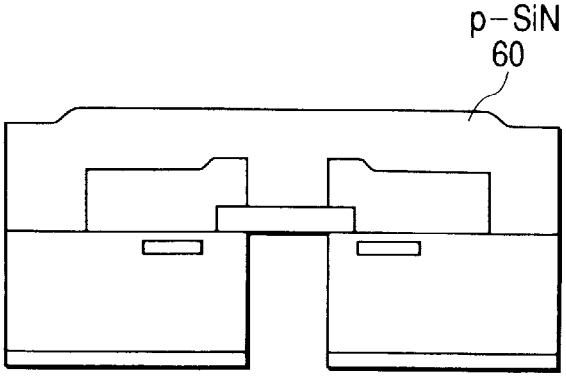
Figure 5:
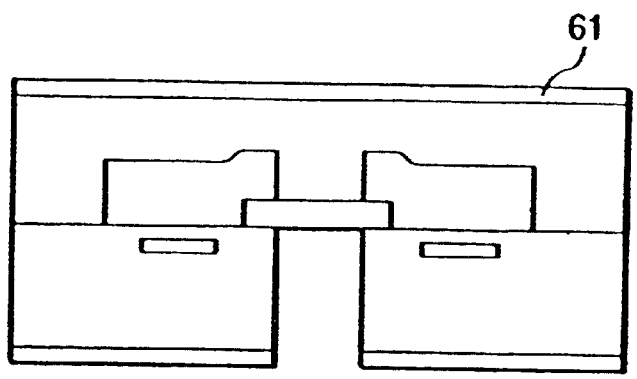
FIGS. 5A, 5B and 5C are views which illustrate, in continuation of the steps shown in FIGS. 4A to 4E, the steps in which is manufactured the ink discharge mechanism portion of the ink jet recording head in accordance with the second embodiment of the present invention.
Figure 5:
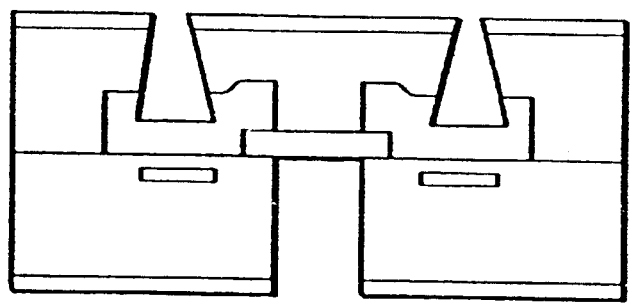
Figure 5:
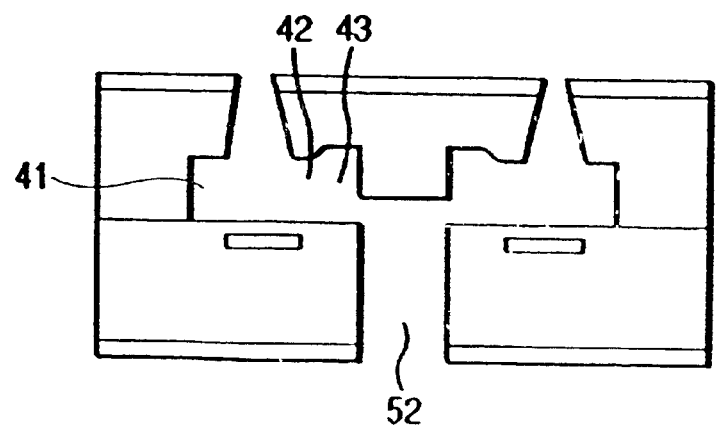

Now, as shown in FIG. 4E, a P—SiN layer 60 is formed by means of CVD in a form to cover the aforesaid aluminum layer 53.

Then, as shown in FIG. 5A, the irregular surface of the P—SiN layer 60, which has been deposited and developed, is smoothed by means of polishing. After that, a water-repellent film 61 is coated, and cured at a high temperature (300° C.).

Then, as shown in FIG. 5B, the aluminum layer 53 is processed up to the middle of its thickness by irradiating laser beams through the pattern of the specific ink discharge port configuration with the specific energy concentration and specific NA thereof, which is emitted from the laser oscillator that outputs laser, beams in a pulse emission period of one picosecond or less from the surface side of the P—SiN layer 60.

Now, as shown in FIG. 5C, the aluminum layer 53, which is patterned in the configuration of the specific ink flow paths 42, ink buffer chamber 41, and ink chamber 43, and the aluminum layer 50 on the upper face of the base plate 40 are removed by means of wet etching, thus completing the ink discharge mechanism portion of an ink jet recording head.

Third Embodiment

Now, in conjunction with FIGS. 6A to 7E, a method for manufacturing the ink discharge mechanism portion of an ink jet recording head will be described in accordance with a third embodiment of the present invention.

Figure 6A:
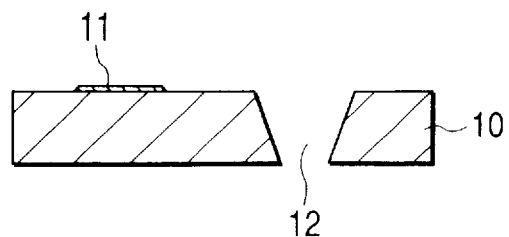
FIGS. 6A, 6B, 6C, 6D and 6E are views which illustrate the steps in which is manufactured the ink discharge mechanism portion of an inkjet recording head in accordance with a third embodiment of the present invention.

At first, as shown in FIG. 6A, a base plate is prepared with an ink supply port 12 formed by etching a silicon circuit base plate 10 which is formed by patterning the ink discharge pressure generating element 11 on silicon.

Figure 6B:
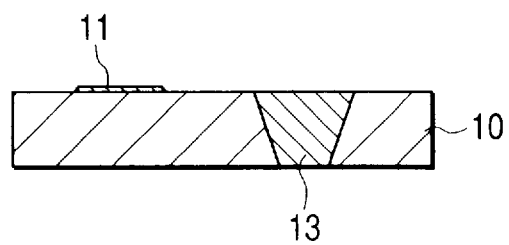

Then, as shown in FIG. 6B, resin 13 is clogged into the ink supply port 12.

Figure 6C:
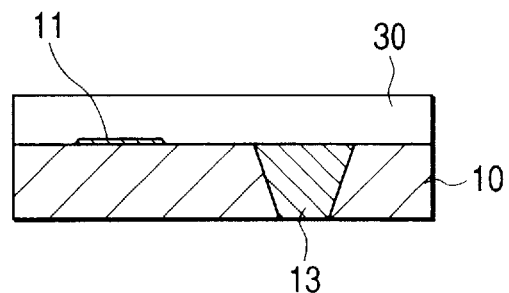

Subsequently, as shown in FIG. 6C, an aluminum layer 30 is laminated by means of vapor deposition to be coated in a predetermined thickness on the ink discharge pressure generating element 11 side.

Figure 6D:
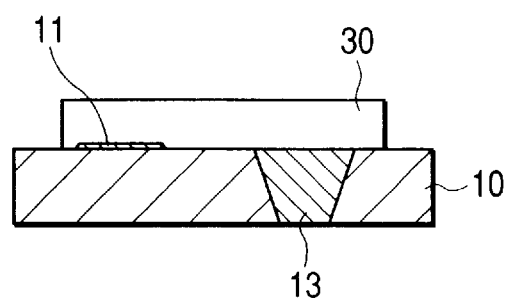

Now, as shown in FIG. 6D, with the patterning lithographic process, the coated aluminum layer 30 is patterned to provide specific ink flow paths, ink buffer chamber, and ink chamber.

Figure 6E:
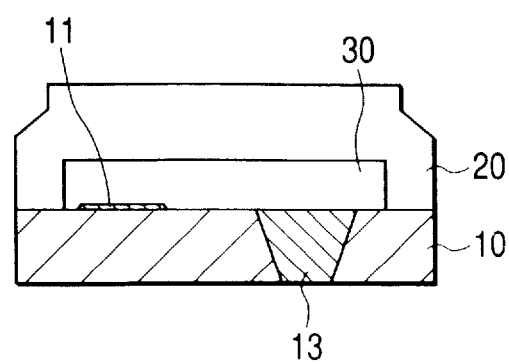
Figure 7:
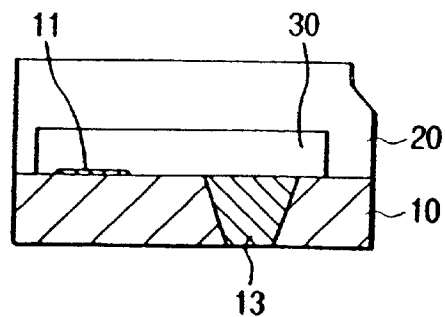
FIGS. 7A, 7B, 7C, 7D and 7E are views which illustrate, in continuation of the steps shown in FIGS. 6A to 6E, the steps in which is manufactured the ink discharge mechanism portion of the ink jet recording head in accordance with the third embodiment of the present invention.
Figure 7:
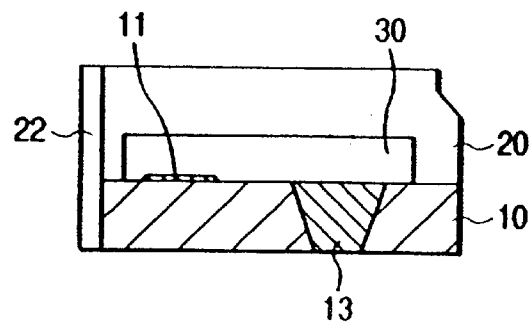
Figure 7:
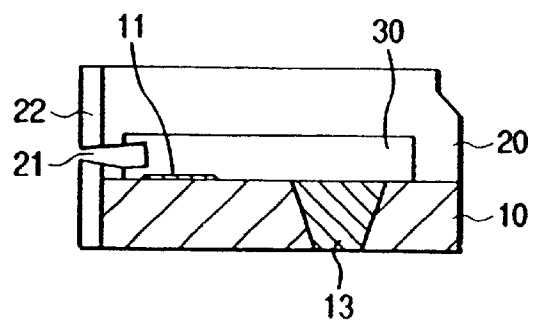
Figure 7:
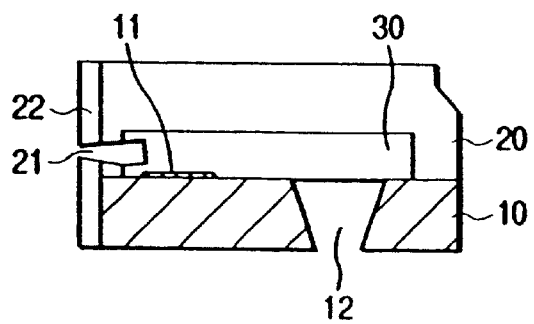
Figure 7:
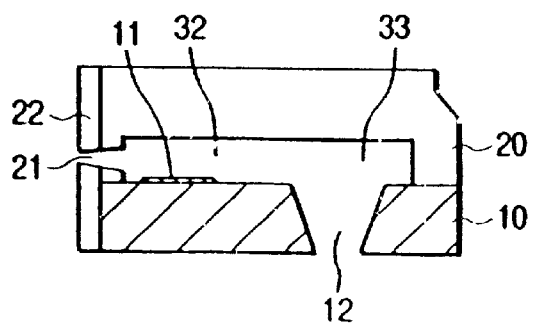

Then, as shown in FIG. 6E, a silicon nitride layer 20 is formed by means of CVD in a form to cover the patterned aluminum layer 30.

Then, as shown in FIG. 7A, the edge face of the silicon nitride layer 20 is cut or ground from the edge face of the aluminum layer 30 so as to enable it to provide a specific thickness, and removed by means of polishing to form the ink discharge port formation surface. Also, the upper face of the silicon nitride layer 20 may be smoothed by means of polishing for the easier assembling of an ink jet recording head in some cases.

Now, as shown in FIG. 7B, a water-repellent film 22 is formed by coating water-repellent agent on the surface of the ink discharge port formation surface of the edge face portion of the silicon nitride layer 20. Depending on the method that requires the removal of resin 13 plugged into the ink supply port 12 in a preprocess, a heat curing may be given at a temperature of 400° C. immediately after the water-repellent agent has been applied so as to enhance the adhesiveness of the water-repellent film.

Then, as shown in FIG. 7C, the ink discharge port is processed to be formed from the edge face of the aluminum layer 30 up to the interior thereof by irradiating laser beams through the pattern of the specific ink discharge port configuration with the specific energy concentration and specific NA thereof, which is emitted from the laser oscillator that outputs laser beams in a pulse emission period of one picosecond or less from the outer side of the ink discharge port formation surface of the edge face portion of the silicon nitride layer 20.

Subsequently, as shown in FIG. 7D, the resin 13 plugged into the ink supply port 12 is removed by means of wet chemical etching.

Now, as shown in FIG. 7E, the aluminum layer 30 having been patterned in the specific form of ink flow paths and ink chamber is removed by means of wet etching so as to complete the ink discharge mechanism portion of the ink jet recording head after having thermally cured the entire portion thereof at a temperature of 400° C. for the enhancement of the adhesiveness of water-repellent film.

Now, in conjunction with FIGS. 8A to 8C, the description will be made of the structure of the ink discharge mechanism portion of an ink jet recording head of edge discharge type.

Figure 8A:
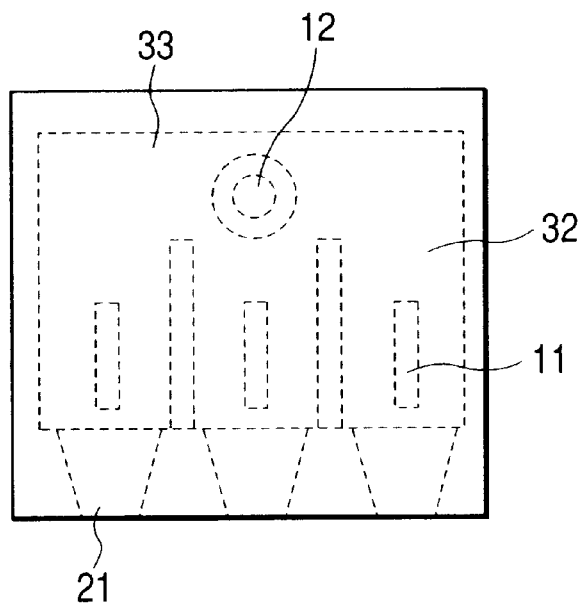
FIGS. 8A, 8B and 8C are views which illustrate the principal part of the ink discharge portion of an ink jet recording head of edge discharge type formed by a method of manufacture in accordance with the third embodiment of the present invention.
Figure 8B:
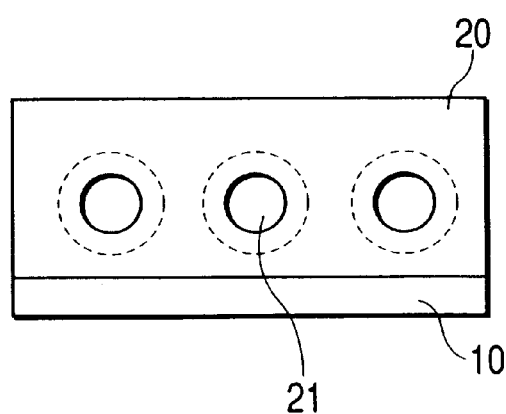
Figure 8C:
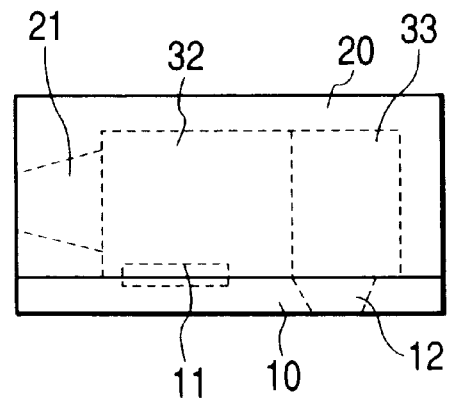

The principal ink discharge portion of the ink jet recording head shown in FIGS. 8A to 8C is processed and formed by the methods described in conjunction with FIG. 6A to FIG. 7E on a silicon IC circuit base plate 10 having ink discharge pressure generating elements 11 mounted thereon. Here, a reference numeral 10 designates a base plate. On this base plate, there are provided ink discharge pressure generating elements 11, such electrothermnal converting elements or electromechanical converting elements, for discharging ink.

The ink discharge principal portion of the ink jet recording head described above can be manufactured through the following steps to be an ink jet recording head.

The electrical base plate, which has the terminals for use of driving ink discharge pressure generating elements patterned thereon, is bonded, and at the same time, the base plate, which is formed by aluminum or alumina-ceramic material having a high heat transfer coefficient, is bonded to the silicon IC base plate for use of heat radiation. Then, the holder that holds each member, and the ink tank that supplies ink are bonded to assemble an ink jet head, hence providing a unit that functions as the ink jet recording head.

What is claimed is:

1. A method for manufacturing an ink jet head provided with an ink discharge mechanism structured to include at least an ink discharge port and an ink flow path on a member having a pressure generating source thereon, said pressure generating source giving pressure to ink being in contact therewith so as to propagate said pressure to the ink discharge port for discharging an ink droplet, and enabling said ink droplet to adhere to a recording medium, comprising the following steps of:

forming in a thick film laminating step a patterning layer corresponding to the configuration of ink flow path on a member provided with said pressure generating source, and overcoating inorganic material layer on said pattering layer to form ink discharge surface;

irradiating the patterned image of predetermined ink discharge port configuration by laser capable of completing sublimate ablation process before the laser beam is dispersed in a work piece as thermal energy;

subsequently, executing the sublimate ablation process on an ink discharge port almost simultaneously from the inorganic material layer on the ink discharge side up to the interior of the thickness of said patterning layer corresponding to the configuration of ink flow path; and removing said patterning layer corresponding to the configuration of the ink flow path after processing said ink discharge port to manufacture an ink jet recording head.

2. A method for manufacturing an ink jet recording head according to claim 1, wherein said laser is the laser continuously emitting from a laser oscillator photopulse having large spatial and temporal energy concentration in pulse emission period of one picosecond or less, and the laser beam emitted from said laser oscillator is irradiated on a specifically patterned image with a predetermined energy concentration and a predetermined number of aperture (NA) for the execution of sublimate ablation almost simultaneously from the inorganic material layer on the ink discharge side up to the interior of the thickness of the patterning layer corresponding to the configuration of said ink flow paths.

3. A method for manufacturing an ink jet recording head according to claim 1, wherein the energy concentration of laser beams satisfies the conditional expression of $$(a \times n \times E)/t > 13 \times 10^6 [W/cm^2]$$

where a is the absorptivity of the laser wave length irradiated to a work piece material; n is the number of aperture of the optical system on the work piece side to project the processing pattern to the work piece; E (unit [J/cm$^2$/pulse]) is energy per unit area of the laser beam irradiated onto the work piece material per unit oscillating pulse period; and t (unit [sec]) is the width of laser oscillation pulse period.

4. A method for manufacturing an ink jet recording head according to claim 1, wherein said laser oscillator is a laser oscillator provided with a spatial compression device for light propagation.

5. A method for manufacturing an ink jet recording head according to claim 4, wherein said spatial compression device for light propagation comprises chirping pulse generating means; and vertical mode synchronizing means utilizing light wavelength dispersion characteristics.

6. A method for manufacturing an ink jet recording head according to claim 1, wherein the formation of the patterning layer corresponding to the configuration of said ink flow path is made by means of photolithographic process.

7. A method for manufacturing an ink jet recording head according to claim 1, wherein the patterning layer corresponding to the configuration of said ink flow paths is formed by metallic material.

8. A method for manufacturing an ink jet recording head according to claim 1, wherein the overcoating of the inorganic material layer for the formation of said ink discharge surface is formed by means of CVD or other chemical deposition development method.

9. A method for manufacturing an ink jet recording head according to claim 1, wherein the overcoating of the inorganic material layer for the formation of said ink discharge surface is formed by means of PVD or plasma flame or other physical deposition development method.

10. A method for manufacturing an ink jet recording head according to claim 1, wherein subsequent to overcoating the inorganic material layer for the formation of said ink discharge surface, the ink discharge surface is polished or grounded for processing for smoothing the ink discharge surface.

11. A method for manufacturing an ink jet recording head according to claim 1, wherein subsequent to overcoating the inorganic material layer for the formation of said ink discharge surface, the ink discharge surface is coated with water-repellent agent and thermally cured.

12. A method for manufacturing an ink jet recording head according to claim 1, wherein the inorganic material layer for the formation of said ink discharge surface is formed by dielectric or ceramic material.

13. A method for manufacturing an ink jet recording head according to claim 1, wherein the removal of the patterning layer corresponding to the configuration of said ink flow path is performed by means of wet etching or other chemical etching.

14. A method for manufacturing an ink jet recording head according to claim 1, wherein said method for manufacturing an ink jet recording head is the method of manufacture of an ink jet recording head of plane discharge type having said pressure generating source arranged above said ink discharge port, and said ink discharge port is processed by sublimate ablation almost simultaneously from the inorganic material layer on said ink discharge side up to the interior of the thickness of the patterning layer corresponding to the configuration of said ink flow path.

15. A method for manufacturing an ink jet recording head according to claim 1, wherein said method for manufacturing an ink jet recording head is the method of manufacture of an ink jet recording head of edge shooter type comprising an ink liquid chamber for supplying ink to said ink discharge port, an ink flow path communicated with said ink liquid chamber, an ink supply port for supplying ink from the outside to said ink liquid chamber, and an energy generating element provided for part of said ink flow path forming said pressure generating source, and the ink discharge formation surface is formed by removing the edge face of said inorganic material layer by cutting or grinding or polishing from the edge face side of said patterning layer overcoated on the edge face and upper face of said inorganic material layer so as to provide a specific thickness thereof, and then, said ink discharge port is processed on said ink discharge port formation surface by sublimate ablation almost simultaneously from said ink discharge side to the edge face of said patterning layer up to the interior thereof.

16. An ink jet recording head provided with an ink discharge mechanism structured to include at least an ink discharge port and an ink flow path on a member having a pressure generating source thereon, said pressure generating source giving pressure to ink being in contact therewith so as to propagate said pressure to the ink discharge port for discharging an ink droplet, and enabling said ink droplet to adhere to a recording medium, and said ink jet recording head being manufactured by a method for manufacturing an ink jet recording head according to either one of claim 1 to claim 15.

17. An ink jet recording head according to claim 16, wherein said ink jet recording head is plane discharge type having said ink discharge port arranged above said pressure generating source.

18. An ink jet recording head according to claim 16, wherein said ink jet recording head is edge shooter type having said ink discharge port on the edge side of said inorganic material layer.

* * * * *